US008193945B2

(12) United States Patent
King et al.

(10) Patent No.: US 8,193,945 B2
(45) Date of Patent: Jun. 5, 2012

(54) SYSTEM AND METHOD FOR REMOTE ACTIVATION USING A TRANSMITTER SWITCH ARRAY

(75) Inventors: Ronald O. King, Brownstown, MI (US); Neal Richard Manson, Southfield, MI (US); Tom Q. Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 1178 days.

(21) Appl. No.: 11/972,880

(22) Filed: Jan. 11, 2008

(65) Prior Publication Data

US 2009/0179767 A1    Jul. 16, 2009

(51) Int. Cl.
G08B 5/00     (2006.01)
G08B 1/08     (2006.01)
G08C 19/16    (2006.01)
B60R 25/10    (2006.01)
H03M 11/00    (2006.01)
B60L 1/00     (2006.01)

(52) U.S. Cl. ............. 340/815.6; 340/12.22; 340/426.13; 340/539.14; 340/4.11; 340/4.61; 341/22; 307/10.1

(58) Field of Classification Search .......................... None
See application file for complete search history.

(56) References Cited

U.S. PATENT DOCUMENTS

| 3,766,400 | A | 10/1973 | Walters |
| 5,113,182 | A * | 5/1992 | Suman et al. ................. 340/5.28 |
| 5,151,696 | A * | 9/1992 | Kasahara et al. ............... 341/22 |
| 5,278,547 | A * | 1/1994 | Suman et al. ................. 340/5.22 |
| 5,381,142 | A * | 1/1995 | Simmons, Jr. ................... 341/26 |
| 5,508,700 | A | 4/1996 | Taylor et al. |
| 5,635,901 | A | 6/1997 | Weinblatt |
| 5,729,642 | A | 3/1998 | Thaniyavarn |
| 5,914,677 | A | 6/1999 | Ahmadian |
| 6,005,522 | A | 12/1999 | Arias et al. |
| RE36,752 | E | 6/2000 | Keepman, Jr. et al. |
| 6,094,045 | A | 7/2000 | Zoellick |
| 6,380,791 | B1 | 4/2002 | Gupta et al. |
| 6,567,495 | B2 | 5/2003 | McGrath et al. |
| 6,650,867 | B2 * | 11/2003 | Redford et al. ........... 434/307 R |
| 6,744,386 | B2 * | 6/2004 | King ............................... 341/22 |
| 6,980,135 | B2 * | 12/2005 | Chang et al. ..................... 341/26 |
| 6,995,995 | B2 | 2/2006 | Zeng et al. |
| 7,123,170 | B1 | 10/2006 | Iacob |
| 2002/0036520 | A1 | 3/2002 | Tanaka et al. |
| 2005/0242923 | A1 | 11/2005 | Pearson et al. |
| 2009/0121842 | A1 * | 5/2009 | Elberbaum ................. 340/10.5 |

* cited by examiner

*Primary Examiner* — Jennifer Mehmood
*Assistant Examiner* — Fekadeselassie Girma
(74) *Attorney, Agent, or Firm* — Brooks Kushman P.C.

(57) ABSTRACT

A system and method for remote activation of a device includes, in one embodiment, a user interface for selecting a command associated with the one or more vehicle functions, a controller for processing the selected command, the controller having a plurality of input ports, and a switch array including a plurality of switches corresponding to the one or more vehicle functions. The plurality of switches can be divided into a first set and a second set with the first set of switches being connected across a fixed voltage and a controller input port and the second set of switches being connected across multiple controller input ports. The at least one of the controller input ports connecting the second set of switches may be temporarily configurable to an output port for determining which of the plurality of switches has been actuated.

20 Claims, 5 Drawing Sheets

SYSTEM AND METHOD FOR REMOTE ACTIVATION USING A TRANSMITTER SWITCH ARRAY

TECHNICAL FIELD

The following relates to a system and method for wireless remote activation of devices in a vehicular environment.

A detailed description and accompanying drawings are set forth below.

DETAILED DESCRIPTION

Figure 1:
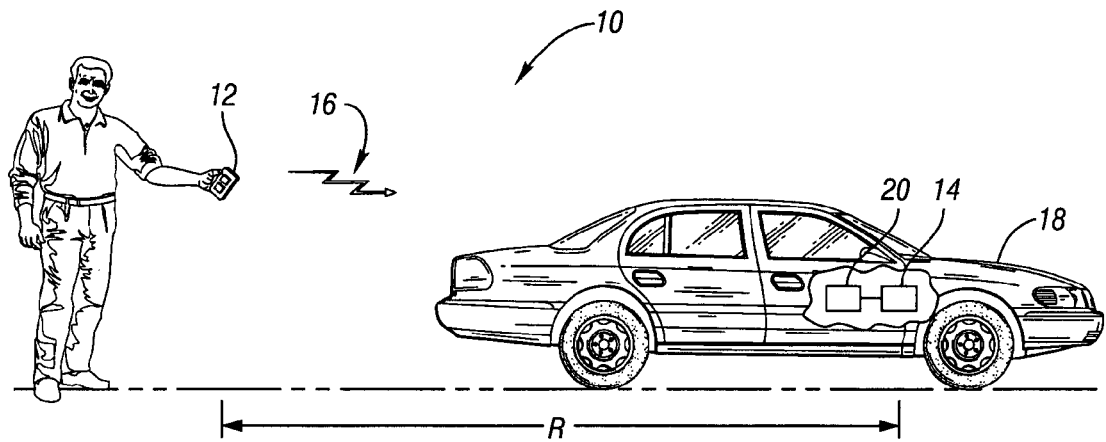
FIG. 1 is a simplified, exemplary environmental block diagram depicting one embodiment of the system described herein.

With reference to FIGS. 1-5, a more detailed description of embodiments of the system and method and various components thereof will now be provided. It is well known in the automotive industry to provide wireless communication systems in vehicles for a variety of applications. These include, but are not limited to, remote keyless entry (RKE), tire pressure monitoring, remote control of garage door opening systems, vehicle immobilization, voice activated controls, and others.

Typical RKE systems provide for remote control by a vehicle owner or user of vehicle security systems, door locks, trunk latch, exterior and/or interior lights, horn and/or alarms. Other vehicle systems or operations that may be remotely controlled by a vehicle user or owner with RKE systems include sliding-door or lift-gate control, remote engine start, vehicle interior climate control, and others.

In that regard, RKE systems for remote vehicle access and other remote operations include a remote control device or unit, which is commonly referred to as a "fob" or "key fob." The remote control unit has a transmitter, and wireless radio frequency ("RF") signals are transmitted by transmitter of the remote control unit that include commands for performing vehicle operations or functions such as unlocking the vehicle doors or starting the vehicle engine. Currently available RKE fobs are hand-held, portable devices, and may be separate units or may be part of an ignition key head.

Such RKE systems also typically include a receiver and/or device control unit installed in the vehicle. RF command signals transmitted by the remote control unit are received by the vehicle-mounted receiver and/or device control unit, and may be relayed to appropriate control circuitry, systems or subsystems in the vehicle in order to effectuate the desired operation or function. For example, the receiver and/or device control unit may be provided in direct or indirect (e.g., over a vehicle bus) communication with door locking mechanisms to lock and unlock the vehicle doors in response to lock or unlock signals received from the remote control unit. Similarly, the receiver and/or device control unit may be provided in communication with other vehicle devices to control operation thereof in response to other signals received from the remote control unit.

RKE systems may be active or passive in nature. Active systems require a vehicle owner or user to manually transmit a command signal, such as by actuating one or more pushbuttons provided on the remote control unit. In passive systems, signals are automatically transmitted so that, for example, a vehicle door may be unlocked as the vehicle owner or user approaches the vehicle and/or touches the door handle to open the door, without the need for any action by the vehicle owner or user.

In that regard, in a passive keyless entry system, a remote unit, which may be referred to as a "fob" or a "card," is typically provided with a transceiver for communicating with a transceiver and/or device control unit installed in the vehicle. In such systems, the remote unit carried by an operator may be used, for example, to automatically unlock the vehicle as the operator approaches the vehicle, without the need for operation of any switch or pushbutton by the operator. Similarly, the system may further be designed to automatically lock the vehicle as the operator, carrying the remote unit, moves away from the vehicle. A vehicle-mounted transceiver and/or device control unit is again provided in direct or indirect communication with control circuitry, systems or subsystems to effectuate a particular operation in response to signals received from the remote unit, such as door locking mechanisms to lock and unlock the vehicle doors.

To prevent unauthorized entry into a vehicle equipped with an RKE system, command signals from remote control units are typically encrypted, such as with a rolling-code encryption scheme where a security code is transmitted with the command signal, that code being different with every transmission. The vehicle-mounted device that receives the command signals is equipped with the same rolling-code encryption scheme in order to de-crypt a received command signal and determine which security code to expect with each command signal received. As a result, even if a command signal is intercepted by a third party, that signal cannot later be re-transmitted by the third party in order to gain entry into the vehicle, since the security code transmitted with that command signal will no longer be accepted as valid by the vehicle-mounted receiver and/or device control unit.

RKE systems are referred to as "one-way" systems where communication or transmission of signals only takes place from the portable remote control unit having a transmitter to the vehicle-mounted device having a receiver. However, as is again well known by those of ordinary skill, RKE systems may also be "two-way" in nature. In "two-way" RKE systems, the portable remote control unit carried by the vehicle user or owner includes a transceiver, and the vehicle-mounted device also includes a transceiver. As both the remote control unit and the vehicle-mounted device are capable of transmitting and receiving wireless signals, two-way communication between those devices is enabled.

Signals transmitted to or from the portable remote control device and/or the vehicle-mounted device in "two-way" RKE systems are again typically encrypted for security purposes. "Two-way" RKE systems also may be either active or passive in nature.

In "two-way" RKE systems, communication from the vehicle-mounted device or unit to the portable remote control device or unit may be for any of a number of purposes, such as for prompting a passive remote control device to transmit a signal, acknowledging the receipt of a command signal from a remote unit, or others. In that regard, the remote control device or unit may be provided with a display, such as a liquid crystal or light emitting diode display, so that the vehicle owner or user can confirm that a command signal has been received by the vehicle-mounted device or unit and that the command has been effectuated (e.g., the vehicle doors have been locked/unlocked; the vehicle engine has been started).

For "two-way" RKE systems in particular, and especially those equipped for remote vehicle engine start, it is increasingly requested that such systems function at long distances from the vehicle. For example, it is often desired that such systems provide for communication between a remote control unit and a vehicle control unit over ranges of more than 200 meters.

As previously noted, remote control units are hand-held, portable devices. The remote control units are equipped with buttons that are associated with different vehicle operations or functions such as Door Unlock, Door Lock, Trunk Release and Engine Start, among others. A user selects a vehicle function or operation to be carried out by depressing one or more of the remote control unit's buttons. User activation of one or more buttons triggers a microcontroller within the remote control unit to signal the transmitter to transmit wireless RF signals corresponding to the button request. The RF signals transmitted by the transmitter of the remote control device include commands for performing the desired vehicle operation or function.

Typical RKE systems provide around five buttons associated with various vehicle operations of functions. Some RKE systems provide as many as eight buttons. However, increasing the number of buttons on a remote control unit requires a microcontroller with additional inputs to accommodate the button increase. Correspondingly, additional button inputs increases the size, and ultimately, the cost of the microcontroller. Diode arrays are often implemented as a way to add more buttons to a remote control unit without increasing the number of inputs on the microcontroller. However, diode arrays require additional, costly hardware and have undesirable limitations such as the ability to press multiple buttons at the same time. Moreover, diode arrays take up already limited space on the printed circuit board (PCB) and increase the number of components to be placed during the manufacturing process, thereby increasing the likelihood of defects.

Thus, there exists a need for an RKE system that can accommodate additional buttons for performing increasingly more vehicle operations or functions without increasing the number if microcontroller inputs, and ultimately, the size and cost of the microcontroller. There also exists a need for an RKE system that can accommodate additional buttons for performing increasingly more vehicle operations or functions while minimizing additional, costly hardware. Such an RKE system shall enhance performance and capability of the system, while decreasing cost, without degrading system performance. Such an RKE system would include an RKE transmitter switch array, which allows the remote control unit to recognize additional button inputs without increasing the number of microcontroller inputs or requiring additional hardware such as diode arrays.

Referring now to the drawings, FIG. 1 is a simplified, exemplary environmental block diagram depicting one embodiment of an RKE system (10). RKE system (10) comprises a portable remote control device or unit (12) and a vehicle-mounted device or control unit (14). The remote unit (12) may be a separate fob or card, part of a vehicle ignition keyhead, or any other suitable configuration known in the art. The remote control unit (12) transmits a wireless command signal (16), which may be radio frequency ("RF") signal, that includes a command message. Remote control unit (12) transmits command signal (16) a distance or range (R) from a vehicle (18) in order to remotely perform a desired vehicle operation or function represented by the command message of command signal (16), such as locking or unlocking vehicle doors, activating or deactivating a vehicle security system, activating or deactivating vehicle interior and/or exterior lights, starting the vehicle engine, and/or others. Such a transmission by remote control unit (12) may be in response to user input, which may be provided to remote control unit (12) in any fashion known in the art, such as actuation of a pushbutton or by voice recognition.

Command signal (16) may be received at the vehicle-mounted control unit (14), which may be mounted at any suitable location on the vehicle (18). Vehicle-mounted control unit (14) relays the command message of the command signal (16) to an appropriate vehicle function (20) in order to effectuate the command, such as locking or unlocking vehicle doors, activating or deactivating a vehicle security system, activating or deactivating vehicle interior and/or exterior lights, starting the vehicle engine, and/or others. In that regard, vehicle function (20) may be, for example, a computer, microprocessor, control circuit, logical device, vehicle system, vehicle device, or vehicle subsystem, or other. Relay of the command message by vehicle-mounted control unit (14) may include translation of the command message of command signal (16) into an output control signal. Vehicle-mounted control unit (14) may be provided in direct communication with vehicle function (20), or may be provided in communication with vehicle function (20) indirectly, such as over a vehicle data or communications bus (not shown).

Figure 2:
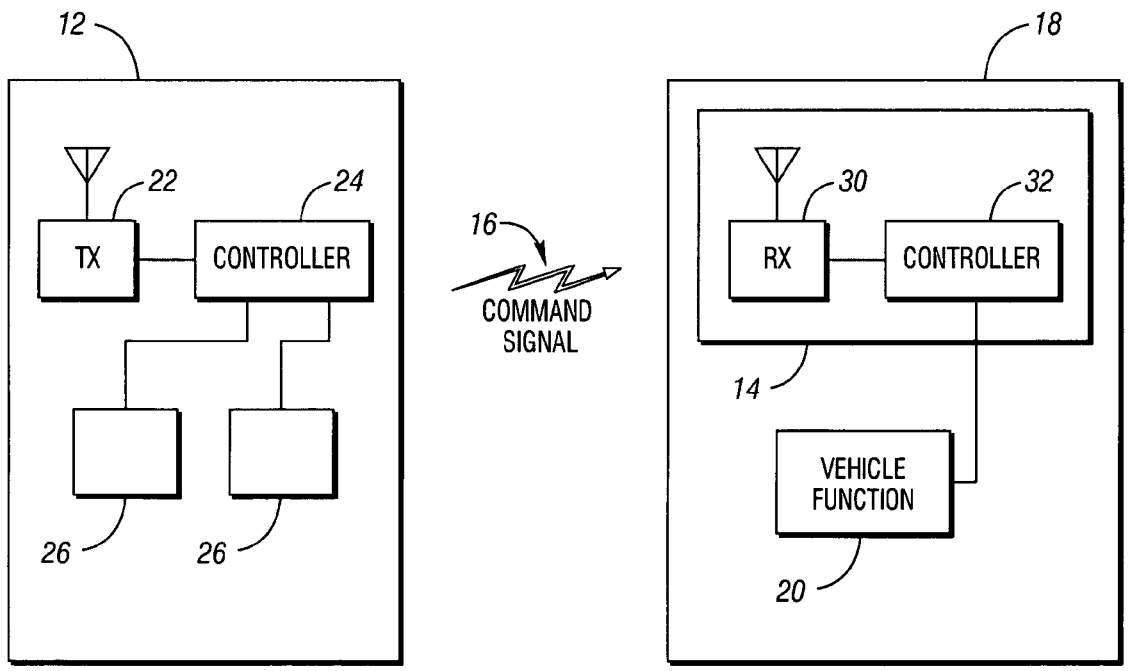
FIG. 2 is a simplified, exemplary block diagram depicting one embodiment of the system described herein.

Referring now to FIG. 2, a simplified, exemplary block diagram depicting one embodiment of an RKE system is shown. As seen therein, remote control unit (12) comprises a transmitter (22) provided in communication with a controller (24). Remote control unit (12) may include one or more buttons or switches (26) which allow a user to provide input to remote control unit (12). For example, as illustrated in FIG. 2, user input may be provided to remote control unit (12) by actuation of a push-button (26) which interfaces with controller (24). Controller (24) may be a computer, microprocessor, control circuit or other logical device which executes application programs and/or which perform other logical exercises. Controller (24) is configured in any known suitable manner to generate command signal (16), which may be in response to user input, and transmitter (22) is configured to transmit command signal (16), which may include using any encryption method (e.g., rolling code), radio frequency (e.g., 315 MHZ), encoding (e.g., Manchester) and/or any modulation scheme known in the art (e.g., on-off keyed ("OOK") modulation, other forms of amplitude shift keyed ("ASK") modulation, frequency shift keyed ("FSK") modulation, or others).

Vehicle-mounted control unit (14) comprises a receiver (30) operative to receive command signal (16) provided in communication with a device controller (32). Device controller (32) may be a computer, microprocessor, control circuit or other logical device which executes application programs and/or which perform other logical exercises. Device controller (32) may be operative to process the command message of command signal (16) received from receiver (30), which may include decrypting, decoding and/or demodulating command signal (16). Device controller (32) may be provided in direct or indirect communication with vehicle function (20) in order to execute the vehicle function or operation represented by the command message of command signal (16), such as locking or unlocking vehicle doors, activating or deactivating a vehicle security system, activating or deactivating vehicle interior and/or exterior lights, starting the vehicle engine, and/or others.

As previously described, greater functionality can be built into an RKE system by adding additional buttons to a remote control unit associated with various additional vehicle functions or operations. As also previously described, however, additional buttons require larger, more expensive microcontrollers to process the extra button requests or additional, costly hardware subject to functional limitations.

In that regard, a remote control unit may be equipped with an array of switches in electrical communication with each other and the controller. Each switch in the array may correspond to a particular button on the remote control unit, which is, in turn, associated with a specific vehicle function or operation. The switch array may be arranged in such a fashion to permit the controller to recognize each of the buttons despite a limited number of controller inputs. For example, a remote control unit may be equipped with as many as eight buttons but use only four inputs on the controller.

The switch array does not require additional, costly hardware as do conventional alternatives (e.g., a diode array). Rather, the switch array can utilize multiple push-button switches, each corresponding to particular button as previously noted, and a minimal amount of pull-up and pull-down resistors. The pull-up resistors connect components of the switch array to a positive supply voltage, while the pull-down resistors connect components of the switch array to ground.

Figure 3:
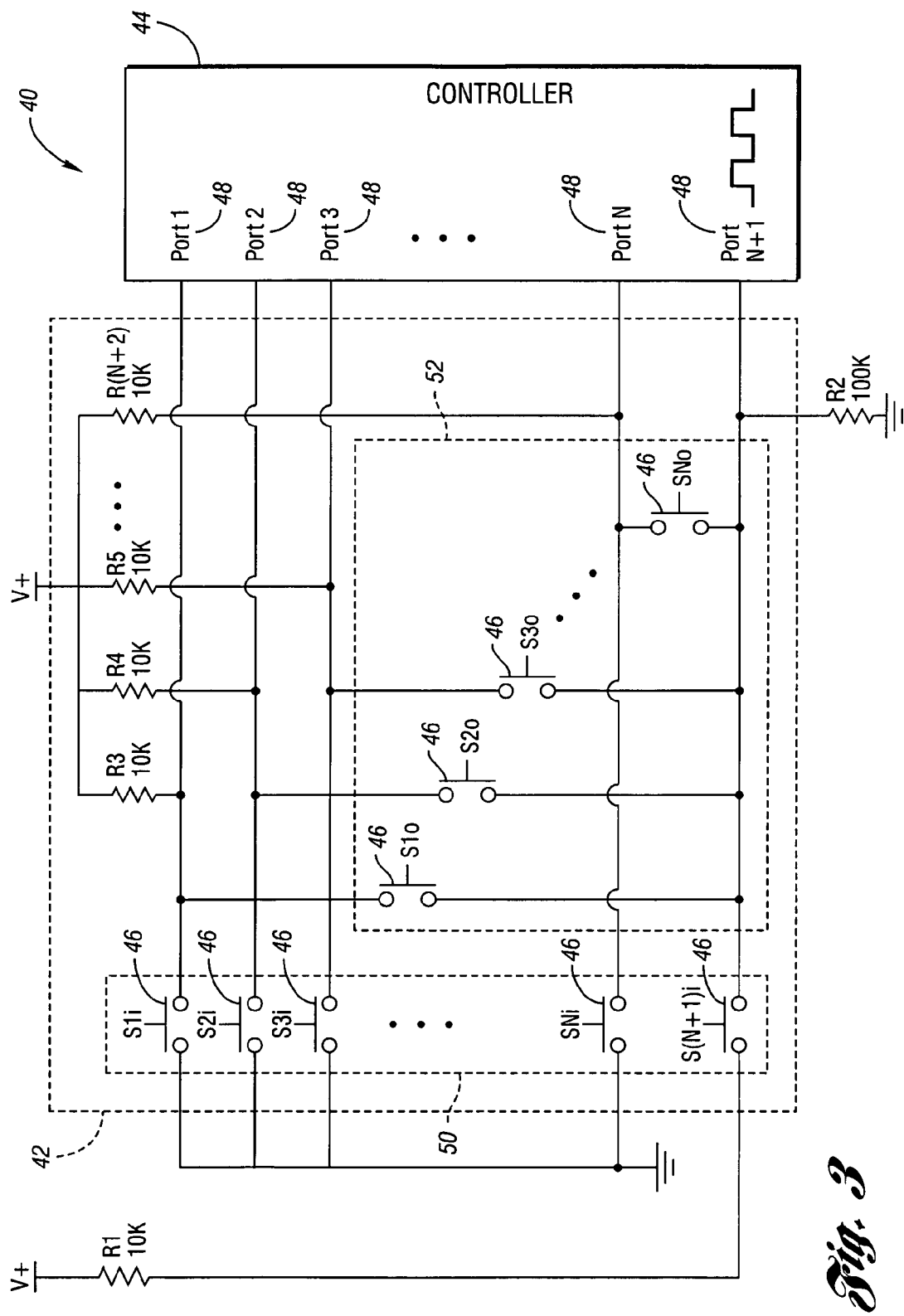
FIG. 3 is a simplified, exemplary schematic diagram depicting one embodiment of the system described herein.

Referring now to FIG. 3, a simplified, exemplary schematic diagram depicting one embodiment of an RKE system is shown. As seen therein, a remote control unit (40) may include a switch array (42) in electrical communication with a controller (44). Similarly, controller (44) can be in electrical communication with a transmitter (not shown) for transmitting wireless RF signals including command messages corresponding to desired vehicle functions or operations. Such vehicle functions or operations may include locking or unlocking vehicle doors, activating or deactivating a vehicle security system, activating or deactivating vehicle interior and/or exterior lights, starting the vehicle engine, and the like.

Switch array (42) can include a plurality of switches or buttons (46) cooperatively arranged with one another and controller (44). Each switch (46), or combination of switches, may correspond to a particular vehicle function or operation, the activation of which instructs controller (44) to communicate, directly or indirectly through the transmitter, with vehicle function (20) (FIGS. 1 and 2) in order to execute the vehicle function or operation represented by the command message of command signal (16). Controller (44) may be equipped with one or more input ports (48) and one or more output ports (not shown). Moreover, select input ports (48) may also be configured to an output port and vice versa. It should be noted that transition from an input port to an output port or from an output port to an input port may occur during initiation and execution of vehicle function or operation as needed.

The schematic depicted in FIG. 3 illustrates an exemplary embodiment of an RKE system. As seen therein, remote control unit (40) may include switch array (42) having a first set of switches (50) (labeled $S1_i$, $S2_i$, $S3_i$, ..., $SN_i$, $S(N+1)_i$). The first set of switches (50) may be connected directly to a fixed voltage. In FIG. 3, switches $S1_i$ to $SN_i$ are shown tied to ground directly. The opposite pole of each of the first set of switches (50) is connected to a corresponding input port (48). As shown in FIG. 3, the input ports corresponding to $S1_i$ to $SN_i$ may be pulled normally high through pull-up resistors to a positive supply voltage (V+). For exemplary purposes, the pull-up resistors are shown having a value of 10 Kohms. However, it should be noted that other resistor values may be substituted without departing from the scope of the present application. Additionally, various power supply voltages may be applied as is known by one of ordinary skill in the art.

Activation (i.e., closing) of one of the plurality of switches (46) included in the first set of switches (50) may result in a voltage level changed being received at a corresponding input port (48). For example, activation of switch $S1_i$ connects Port 1 directly to ground, which can result in a voltage level change from high to low read on Port 1. Similar voltage level changes may occur at the corresponding ports upon activation of switches $S2_i$ to $SN_i$.

The first set of switches (50) may also contain a switch $S(N+1)_i$ tied to the positive supply voltage, as shown in FIG. 3. The opposite pole of switch $S(N+1)_i$ may be connected directly to corresponding Port N+1. Port N+1 may be pulled normally low through a pull-down resistor connected to ground. For exemplary purposes only, the pull-down resistor is shown having a value of 100 Kohms. However, it should be noted that other resistor values may be substituted without departing from the scope of the present application.

Activation of switch $S(N+1)_i$ connects Port N+1 to the positive supply voltage through a pull-up resistor, which can result in a voltage level change from low to high read on Port N+1. The voltage level change at Port N+1 can alert or "wake up" controller (44) causing controller (44) to register the voltage level change. Port N+1 may be an input port that can be switched or configured briefly to an output port for purposes of sending a unique data message. In this instance, the receipt of a voltage level change at Port N+1 may trigger Port N+1 to change to an output port and transmit the unique data message to switch array (42). It should be noted that the unique data message can be any signal that will differentiate it from the other port such as a pulse at various lengths, pure data, or any other signal that can be read at a controller input port as known by one of ordinary skill in the art.

The reconfiguring of Port N+1 from an input port to an output port along with the subsequent transmission of the unique data message may occur immediately after the receipt of a voltage level change at Port N+1 as will be clear from the description below.

According to FIG. 3, switch array (42) may also include a second set of switches (52) (labeled $S1_o$, $S2_o$, $S3_o$, ..., $SN_o$). The second set of switches (52) may be connected across controller input ports (48). In the example shown in FIG. 3, each of the second set of switches (52) is connected by one pole to Port N+1 and the other pole to a corresponding input port (Port 1 to Port N). As is also shown, one side of each of the second set of switches (52) may be tied to the positive supply voltage through a pull-up resistor, while the other side may be tied to ground through a pull-down resistor. Accordingly, activation of any of the second set of switches (52) may result in a voltage level change at Port N+1 from low to high similar to the voltage level change that occurs upon activation of switch $S(N+1)_i$.

Initially, controller (44) may not discern the source of the voltage level change that occurs at Port N+1 because such change may be caused by activation of any of the second set of switches (52) or switch $S(N+1)_i$, or a combination thereof. Accordingly, Port N+1 changes to an output port and transmits the unique data message. As previously mentioned, Port N+1 can send the unique data message almost immediately, such as prior to the source switch deactivating (i.e., opening). To this end, the unique data message can be received at whichever input port corresponds to the opposite pole of the activated switch. For example, if switch $S1_o$ is activated, a voltage level change occurs at Port N+1 causing controller (44) to send the unique data message from Port N+1, which may then be received at Port 1 since the activation of switch S10 connects Port 1 to Port N+1. Thus, controller (44) can determine that switch 510 was activated and respond accordingly by transmitting the appropriate command signal (16).

If the unique data message is received at multiple input ports, controller (44) can determine that multiple switches have been activated and transmit the appropriate command signal (16) according to the switches activated simultaneously. Additionally, if the unique data message is not received at any input port, then controller (44) may determine that switch S(N+1), was activated.

Accordingly, switch array (42) exemplified in FIG. 3 can provide remote control unit (40) increased functionality without the additional cost associated with larger microcontrollers and or additional costly hardware. Switch array (42) can allow remote control unit (40) to control additional vehicle functions (20) with minimal microcontroller inputs.

It should be noted that switch array (42) can be arranged and/or modified to provide a remote control unit having more or less switches. Moreover, switch array (42) can include a plurality of input ports configurable to an output port. Accordingly, even more switches can be provided in a remote control unit having limited controller inputs. An example is described below with reference to FIG. 4.

Figure 4:
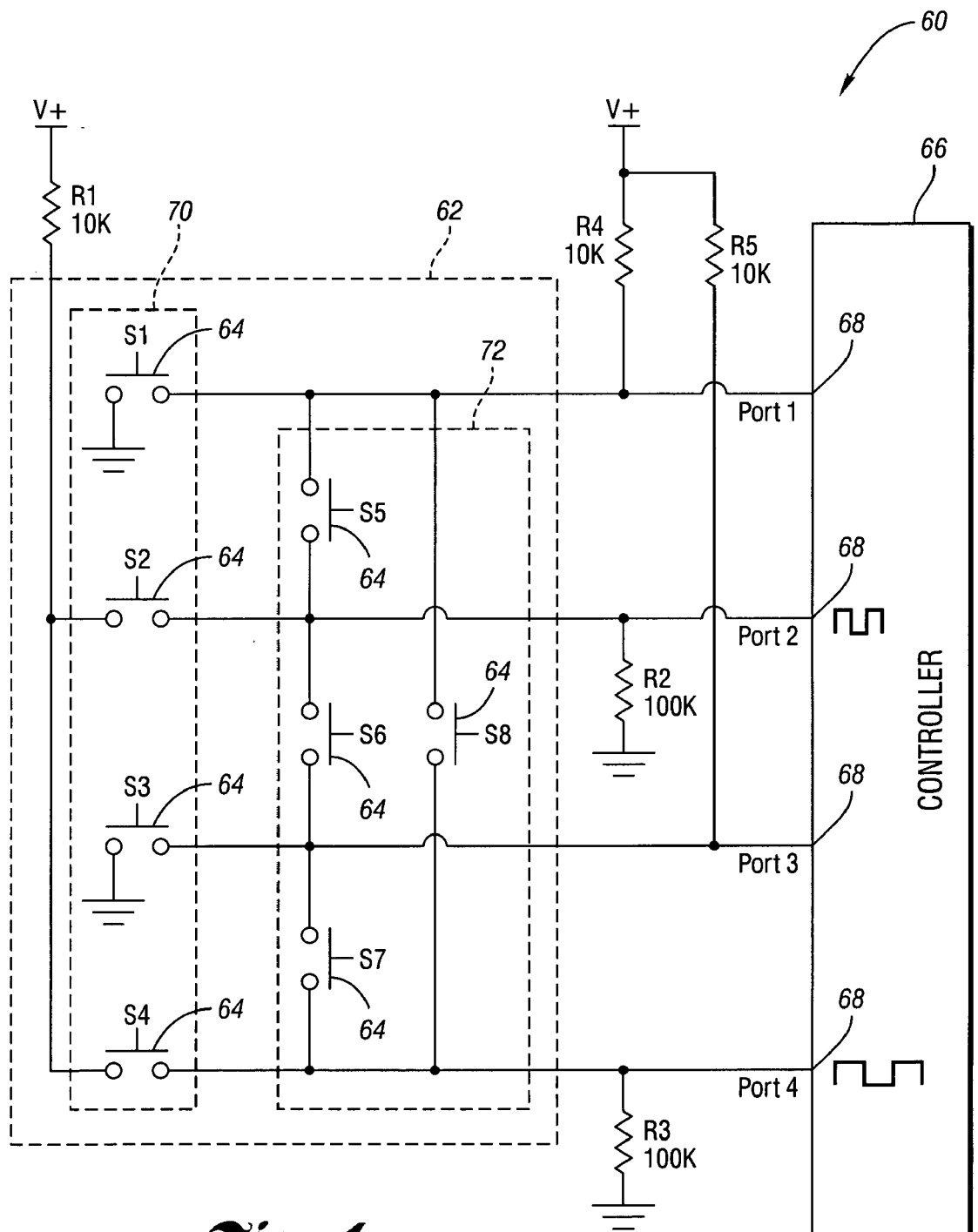
FIG. 4 is a simplified, exemplary schematic diagram depicting another embodiment of the system described herein.

The schematic depicted in FIG. 4 illustrates another exemplary embodiment of an RKE system. As seen therein, a remote control unit (60) may include a switch array (62) having a plurality of switches or buttons (64) for communicating with a controller (66) having a lesser plurality of input ports (68). Similarly, controller (66) can be in electrical communication with a transmitter (not shown) for transmitting wireless RF signals including command messages corresponding to desired vehicle functions or operations. Such vehicle functions or operations may include locking or unlocking vehicle doors, activating or deactivating a vehicle security system, activating or deactivating vehicle interior and/or exterior lights, starting the vehicle engine, and the like.

The plurality of switches or buttons (64) may be cooperatively arranged with one another and controller (44). Each switch (64), or combination of switches, may correspond to a particular vehicle function or operation, the activation of which instructs controller (66) to communicate, directly or indirectly through the transmitter, with vehicle function (20) (FIGS. 1 and 2) in order to execute the vehicle function or operation represented by the command message of command signal (16).

It should be noted that alternate switch array configurations including more or less than the number of switches illustrated are fully contemplated herein without departing from the scope of the present application. To this end, such alternate switch array configurations may cooperate with controllers having comparatively greater or fewer input ports.

As seen in the exemplary embodiment shown, controller (66) includes four input ports (Port 1 to Port 4) for accommodating eight switches or buttons (S1 to S8). Two of the four input ports, Port 2 and Port 4, for example, may convert to output ports during the processing of a button push, as described with respect to FIG. 3. However, prior to receipt of a button push, each port is configured as an input.

As shown, Ports 1 and 3 may be configured normally high. Port 1 can be normally high through R4 (10K) to the positive supply voltage (V+). The positive supply voltage may be an appropriate supply voltage rated for powering electronic hardware devices and integrated circuits (ICs) within remote control unit (60) (e.g., 3 volts or 5 volts). Likewise, Port 3 can be normally high through R5 (10K) to the positive supply voltage (V+). It should be noted that other resistor values may be substituted for R4 and R5 without departing from the scope of the present application. On the other hand, Ports 2 and 4 may be configured normally low. Port 2 can be normally low through R2 (100K) to ground, while Port 4 can be normally low through R3 (100K) to ground. It should be noted that other resistor values may be substituted for R2 and R3 without departing from the scope of the present application.

Similar to the embodiment exemplified in FIG. 3, switch array (62) depicted in FIG. 4 can include a first set of switches (70) and a second set of switches (72). The first set of switches (70) (e.g., S1 to S4) may be connected directly to a fixed voltage. In FIG. 4, switches S1 and S3 are shown tied to ground directly. The opposite pole of each of switch S1 and S3 may be connected to a corresponding input port, Port 1 and Port 3, respectively. Switches S2 and S4 are shown connected to the positive supply voltage through a pull-up resistor R1 (100KΩ). The opposite pole of each of switch S2 and S4 may be connected to a corresponding input port, Port 2 and Port 4, respectively.

The second set of switches (72) may be connected across controller input ports (68). In the example shown in FIG. 4, each of the second set of switches (72) (S5 to S8) is connected by one pole to a controller port that may be converted to an output port, Port 2 or Port 4, and the other pole to a corresponding input port, Port 1 or Port 3. As is also shown, one side of each of the second set of switches (72) may be tied to the positive supply voltage through a pull-up resistor (R4 or R5), while the other side may be tied to ground through a pull-down resistor (R2 or R3).

If a voltage level change (high to low or low to high) is sensed at any one of the input ports (68) of controller (66), controller (66) is activated ("wakes up") indicating that a switch or button (64) on remote control unit (60) has been pressed. If controller (66) detects a voltage level change at Port 1 (e.g., high to low), controller (66) knows that switch S1 has been pressed and responds accordingly. Similarly, if controller (66) detects a voltage level change at Port 3 (e.g., high to low), controller (66) knows that switch S3 has been pressed and acts accordingly.

Switch array (62) may be arranged, as shown in FIG. 4, such that Port 2 can detect a voltage level change (low to high) indicating that either switch S2, S5 or S6 has been pressed. Once controller (66) detects a voltage level change at Port 2, controller (66) immediately configures Port 2 to an output port and sends a unique data message from Port 2. The unique data message is outputted from Port 2 before the source switch is deactivated (i.e., opened). Receipt of the unique data message at Port 1 indicates that switch S5 has been pressed. Receipt of the unique data message at Port 3 indicates that switch S6 has been pressed. Of course, receipt of the unique data message at both Port 1 and Port 3 indicates that switch S5 and S6 have been pressed simultaneously. If the unique data message is not received at any of the input ports, then controller (66) may determine that switch S2 has been pressed.

Switch array (62) may also be arranged, as shown in FIG. 4, such that Port 4 can detect a voltage level change (low to high) indicating that either switch S4, S7 or S8 has been pressed. Once controller (66) detects a voltage level change at Port 4, controller (66) immediately configures Port 4 to an output port and sends a unique data message from Port 4. The unique data message is outputted from Port 4 before the source switch is deactivated (i.e., opened). Receipt of the unique data message at Port 1 indicates that switch S8 has been pressed. Receipt of the unique data message at Port 3 indicates that switch S7 has been pressed. Of course, receipt of the unique data message at both Port 1 and Port 3 indicates that switch S7 and S8 have been pressed simultaneously. If the unique data message is not received at any of the input ports, then controller (66) may determine that switch S4 has been pressed.

Accordingly, in the embodiment exemplified by FIG. 4, as may as eight (8) switches or buttons can be accommodated by remote control unit (60) having a microcontroller with only four (4) inputs. Moreover, more than eight (8) vehicle functions (20) can be controlled by remote control unit (60) if two or more switches (64) are pressed simultaneously. Thus, significant functionality can be added to a remote control unit without switching to a larger microcontroller or adding costly hardware.

It should be noted that the schematic diagram depicted in FIG. 4 is exemplary only, and thus, illustrates one way in which a switch array can be configured according to an embodiment of the present application. To this end, resistor values are suggestive only. Other values, combinations and/or arrangements may be implemented without departing from the scope of the present application. Moreover, devices can be interchanged, substituted, added, or deleted without departing from the scope of the present application.

Figure 5A:
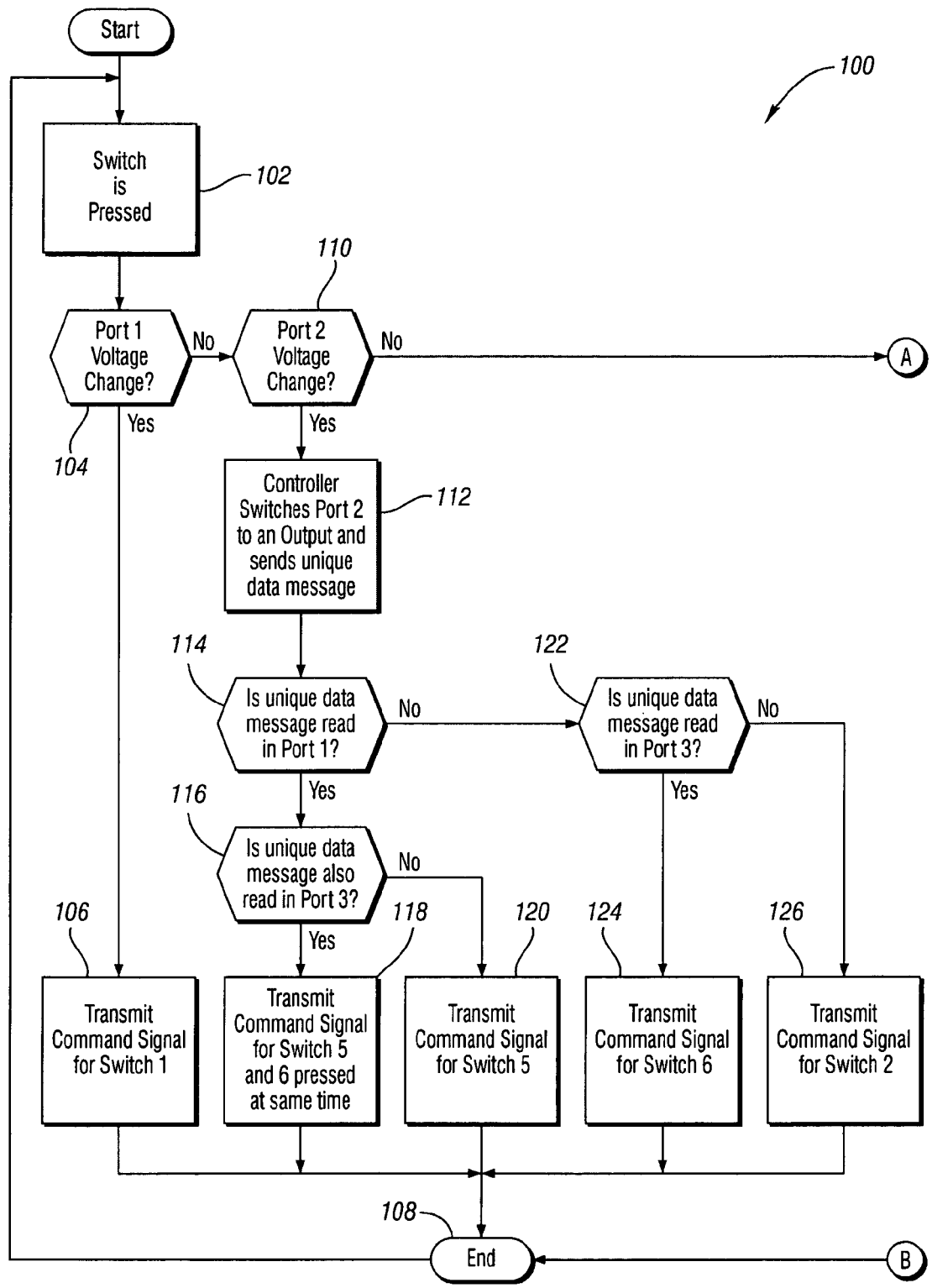
FIGS. 5a-b are a simplified, exemplary flowchart depicting one embodiment of the method described herein.
Figure 5B:
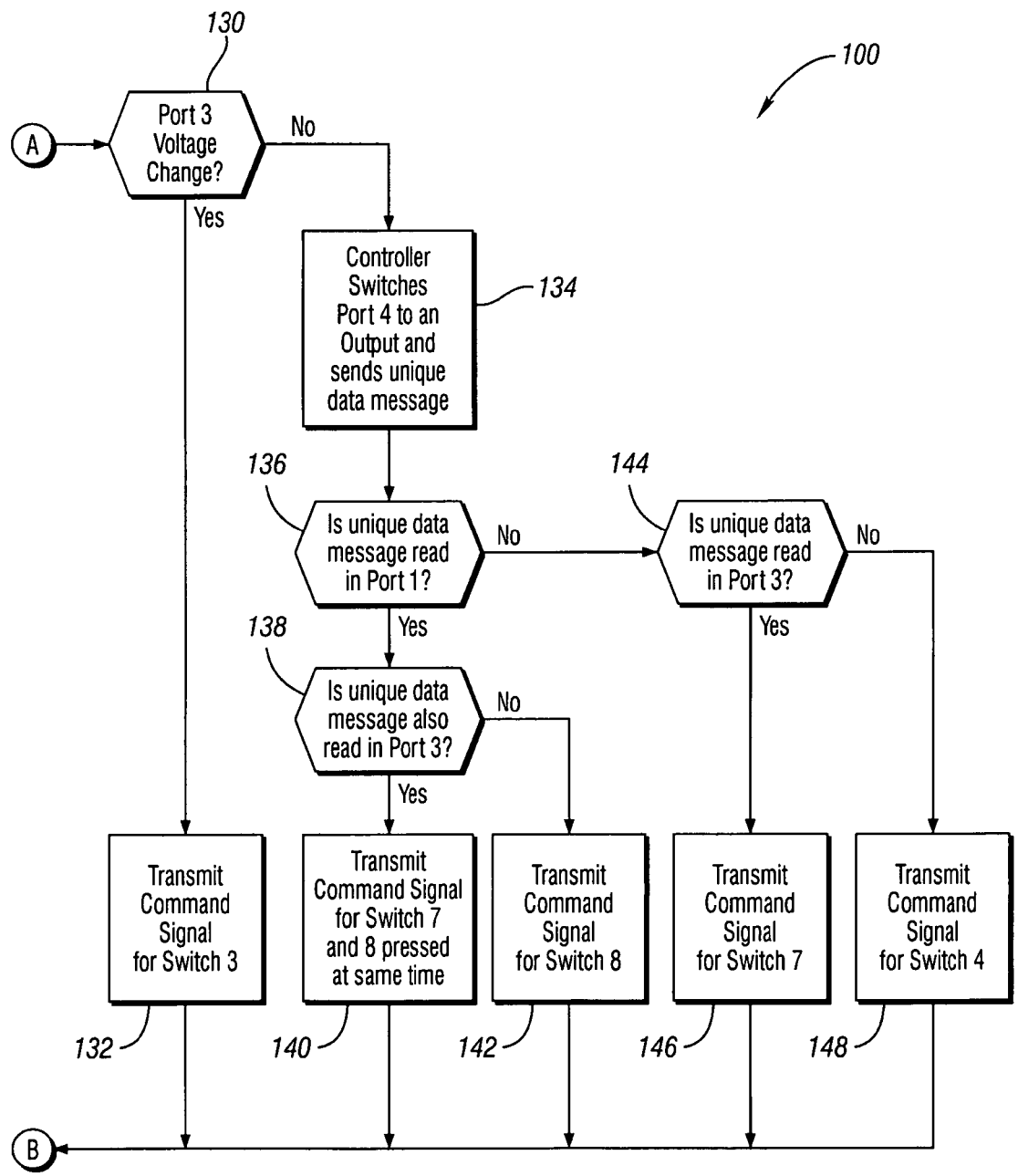

Referring now to FIGS. 5a and 5b, a simplified, exemplary flowchart depicting an embodiment of an RKE method (100), as related to the RKE system illustrated in FIG. 4, is shown. As seen therein, upon user actuation of a remote control unit push-button or switch representing a command for a remote operation (102), the remote control unit can determine if a voltage level change at Port 1 occurs (104). If the remote control unit detects a voltage level change at Port 1, the remote control unit may determine that a user selected a command associated with switch S1 and transmit a corresponding command signal to a vehicle control unit (106). Action then ends (108).

Alternatively, if the remote control unit does not detect a voltage level change at Port 1 (104), the remote control unit may then determine if a voltage level change at Port 2 occurs (110). If the remote control unit detects a voltage level change at Port 2, the remote control unit may change Port 2 to an output port and transmit a unique data message from Port 2 (112). The remote control unit can then determine if the remote control unit detects the unique data message at Port 1 (114). If the unique data message is received at Port 1, the remote control unit may then determine if the unique data message is also received at Port 3 (116). If the unique data message is also received at Port 3, the remote control unit may determine that a user selected a command associated with switches S5 and S6, pressed simultaneously, and transmit a corresponding command signal to a vehicle control unit (118). Action then ends (108). If, alternatively, the unique data message is not also received at Port 3, the remote control unit may determine that a user selected a command associated with switch S5 only and transmit a corresponding command signal to the vehicle control unit (120). Action then ends (108).

Alternatively, if the remote control unit does not detect the unique data message at Port 1 (114), then the remote control unit may determine if the unique data message is received at Port 3 (122). If the unique data message is received at Port 3, the remote control unit may determine that a user selected a command associated with switch S6 only and transmit a corresponding command signal to the vehicle control unit (124). Action then ends (108). If, however, the unique data message is not received at Port 3, the remote control unit may determine that a user selected a command signal associated with switch S2 and transmit a corresponding command signal to the vehicle control unit (126). Action then ends (108).

Referring back to decision block (110), the remote control unit may determine that a voltage level change is not detected at Port 2. In this instance, the remote control unit may determine if a voltage level change at Port 3 occurs (130). If the remote control unit detects a voltage level change at Port 3, the remote control unit may determine that a user selected a command associated with switch S3 and transmit a corresponding command signal to the vehicle control unit (132). Action then ends (108).

Alternatively, if the remote control unit does not detect a voltage level change at Port 3 (130), the remote control unit may change Port 4 to an output port and transmit a unique data message from Port 4 (134). The remote control unit can then determine if the remote control unit detects the unique data message at Port 1 (136). If the unique data message is received at Port 1, the remote control unit may then determine if the unique data message is also received at Port 3 (138). If the unique data message is also received at Port 3, the remote control unit may determine that a user selected a command associated with switches S7 and S8, pressed simultaneously, and transmit a corresponding command signal to a vehicle control unit (140). Action then ends (108). If, alternatively, the unique data message is not also received at Port 3, the remote control unit may determine that a user selected a command associated with switch S8 only and transmit a corresponding command signal to the vehicle control unit (142). Action then ends (108).

Alternatively, if the remote control unit does not detect the unique data message at Port 1 (136), then the remote control unit may determine if the unique data message is received at Port 3 (144). If the unique data message is received at Port 3, the remote control unit may determine that a user selected a command associated with switch S7 only and transmit a corresponding command signal to the vehicle control unit (146). Action then ends (108). If, however, the unique data message is not received at Port 3, the remote control unit may determine that a user selected a command signal associated with switch S4 and transmit a corresponding command signal to the vehicle control unit (148). Action then ends (108).

It should be noted that the method of FIGS. 5 and 6 as described herein is exemplary only, and that the functions or steps of the method could be undertaken other than in the order described and/or simultaneously as may be desired, permitted and/or possible.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the application.

What is claimed is:

1. A remote control unit for activation of one or more vehicle functions, the remote control unit comprising:
    a user interface for selecting a command associated with the one or more vehicle functions;
    a controller for processing the selected command, the controller having a plurality of input ports; and
    a switch array having a plurality of switches corresponding to the one or more vehicle functions, the plurality of switches including a first set and a second set, each of the first set of switches connected between a fixed voltage and one of the plurality of input ports and each of the second set of switches connected between two of the plurality of input ports;

wherein at least one of the plurality of input ports connected to the second set of switches is convertible to an output port for sending a data message upon actuation of at least one of the plurality of switches for determining the selected command.

2. The remote control unit of claim 1, wherein the selected command is associated with the actuation of at least one of the plurality of switches for signaling the controller to convert the at least one input port, corresponding to the at least one of the plurality of switches, to an output port for sending the data message.

3. The remote control unit of claim 2, wherein the controller determines the selected command based upon receipt of the data message at one or more of the plurality of input ports.

4. The remote control unit of claim 2, wherein the controller determines the selected command based upon a failure to receive the data message at any of the plurality of input ports.

5. The remote control unit of claim 1, wherein the selected command is associated with the actuation of at least one of the plurality of switches for signaling the controller directly that the at least one of the plurality of switches has been actuated.

6. The remote control unit of claim 1, wherein every other input port of the plurality of input ports is convertible to an output port for determining the selected command.

7. The remote control unit of claim 1, wherein the selected command is associated with one or more vehicle functions corresponding to two or more of the plurality of switches actuated simultaneously.

8. The remote control unit of claim 1, further comprising a transmitter for transmitting a command signal corresponding to the selected command.

9. A method for remote activation of a device for performing one or more vehicle functions using a remote control unit including a user interface for selecting a command associated with the one or more vehicle functions, a controller having a plurality of input ports for processing the selected command, and a switch array having a plurality of switches corresponding to the one or more vehicle functions, the plurality of switches including a first set and a second set, each of the first set of switches connected between a fixed voltage and one of the plurality of input ports and each of the second set of switches connected between two of the plurality of input ports, at least one of the plurality of input ports being convertible to an output port, the method comprising:
 detecting a voltage level change at an at least one of the plurality of input ports of the controller;
 sending a data message upon the actuation of at least one of the plurality of switches that triggers the voltage level change at the at least one of the plurality of input ports convertible to an output port, wherein data message is capable of receipt by the plurality of input ports; and
 transmitting a command signal according to which of the plurality of input ports receive the data message, the command signal corresponding to the selected command.

10. The method of claim 9, wherein the step of sending a data message further comprises:
 converting the at least one of the plurality of input ports to an output port for sending the data message if the voltage level change is received at the at least one of the plurality of input ports.

11. The method of claim 10, wherein the command signal is based upon a failure to receive the data message at any of the plurality of input ports.

12. The method of claim 10, further comprising:
 receiving the data message at one or more of the plurality of input ports and transmitting the corresponding command signal accordingly.

13. The method of claim 9, further comprising:
 transmitting the command signal immediately upon detection of the voltage level change at an at least one of the plurality of input ports not convertible to an output port.

14. The method of claim 9, wherein the command signal corresponding to the selected command is transmitted by a transmitter in communication with the controller.

15. The method of claim 9, wherein the selected command is associated with one of the plurality of switches.

16. The method of claim 9, wherein the selected command is associated with two or more of the plurality of switches actuated simultaneously.

17. A remote keyless entry (RKE) system for remote activation of a device in a vehicle for controlling one or more vehicle functions, the RKE system comprising:
 a remote control unit including:
  a user interface for selecting a command associated with the one or more vehicle functions,
  a remote microcontroller for processing the selected command, the remote microcontroller having a plurality of input ports, at least one of the plurality of input ports convertible to an output port,
  a switch array having a plurality of switches corresponding to the one or more vehicle functions, the plurality of switches including a first set and a second set, each of the first set of switches connected between a fixed voltage and one of the plurality of input ports and each of the second set of switches connected between two of the plurality of input ports, at least one of which is convertible to an output port for sending a data message for determining the selected command upon the actuation of at least one of the plurality of switches, and
  a transmitter for transmitting a command signal to the vehicle corresponding to the selected command; and
 a vehicle control unit located in the vehicle including:
  a receiver for receiving the transmitted command signal corresponding to the selected command, and
  a device controller in communication with the receiver for effectuating the one or more vehicle functions according to the selected command.

18. The RKE system of claim 17, wherein the selected command is associated with the actuation of at least one of the plurality of switches for signaling the controller to convert the at least one input port, corresponding to the at least one of the plurality of switches, to an output port for sending the data message.

19. The RKE system of claim 18, wherein the controller determines the selected command based upon receipt of the data message at one or more of the plurality of input ports.

20. The RKE system of claim 18, wherein the controller determines the selected command based upon a failure to receive the data message at any of the plurality of input ports.

* * * * *